United States Patent
Costea et al.

(10) Patent No.: US 8,166,113 B2
(45) Date of Patent: Apr. 24, 2012

(54) ACCESS LIMITED EMM DISTRIBUTION LISTS

(75) Inventors: Mihai Costea, Redmond, WA (US); Konstantin Ryvkin, Kirkland, WA (US); Malcolm E. Pearson, Kirkland, WA (US); Roy Williams, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 761 days.

(21) Appl. No.: 11/461,984

(22) Filed: Aug. 2, 2006

(65) Prior Publication Data

US 2008/0034042 A1   Feb. 7, 2008

(51) Int. Cl.
   *G06F 15/16*   (2006.01)
(52) U.S. Cl. .............. 709/206; 709/203; 709/204
(58) Field of Classification Search .......... 709/206, 709/220, 225, 237, 245
   See application file for complete search history.

(56) References Cited

U.S. PATENT DOCUMENTS

| | | | |
|---|---|---|---|
| 5,872,930 A | 2/1999 | Masters et al. | |
| 6,052,709 A | 4/2000 | Paul | |
| 6,073,142 A | 6/2000 | Geiger et al. | |
| 6,163,809 A * | 12/2000 | Buckley | 709/237 |
| 6,167,434 A | 12/2000 | Pang | |
| 6,208,720 B1 | 3/2001 | Curtis et al. | |
| 6,393,464 B1 | 5/2002 | Dieterman | |
| 6,421,709 B1 | 7/2002 | McCormich et al. | |
| 6,480,885 B1 | 11/2002 | Olivier | |
| 6,542,075 B2 | 4/2003 | Barker et al. | |
| 6,553,425 B1 * | 4/2003 | Shah et al. | 709/245 |
| 6,636,965 B1 * | 10/2003 | Beyda et al. | 713/152 |
| 6,678,828 B1 | 1/2004 | Pham et al. | |
| 6,691,156 B1 | 2/2004 | Drummond et al. | |
| 6,704,772 B1 | 3/2004 | Ahmed et al. | |
| 6,751,657 B1 * | 6/2004 | Zothner | 709/220 |
| 6,760,420 B2 | 7/2004 | Heilmann et al. | |
| 6,779,021 B1 | 8/2004 | Bates et al. | |

(Continued)

FOREIGN PATENT DOCUMENTS

EP    1143665 B1    10/2001

OTHER PUBLICATIONS

Sun Microsystems, Chapter 5 Deployment Design, Online, Feb. 2005, Retrieved Jul. 2009, http://web.archive.org/web20050219003745/http://docs.sun.com/source/819-0058/dep_archetect.html, pp. 1-22.

(Continued)

*Primary Examiner* — Firmin Backer
*Assistant Examiner* — Keyvan Emdadi
(74) *Attorney, Agent, or Firm* — Senniger Powers LLP

(57) ABSTRACT

An electronic mail message (EMM) addressed to a distribution list of an enterprise is received at a server of the enterprise from a sending address outside of the enterprise. If the distribution list has no external addresses, then the EMM is blocked from being delivered to the distribution list. In an embodiment, if the distribution list has an external address and the sending address is identified in a safe sender list corresponding to the distribution list, then the EMM is delivered to the distribution list. In an embodiment, if the distribution list has an external address, the sending address is not in a safe sender list corresponding to the distribution list, and the content of the message is approved, then the EMM is delivered to the distribution list.

14 Claims, 2 Drawing Sheets

U.S. PATENT DOCUMENTS

| | | | |
|---|---|---|---|
| 6,816,884 B1 * | 11/2004 | Summers | 709/206 |
| 6,868,498 B1 | 3/2005 | Katsikas | |
| 6,931,532 B1 | 8/2005 | Davis et al. | |
| 6,941,459 B1 | 9/2005 | Hind et al. | |
| 6,961,849 B1 | 11/2005 | Davis et al. | |
| 6,978,367 B1 | 12/2005 | Hind et al. | |
| 7,007,067 B1 | 2/2006 | Azvine et al. | |
| 7,027,463 B2 | 4/2006 | Mathew et al. | |
| 7,181,017 B1 | 2/2007 | Nagel et al. | |
| 7,206,814 B2 | 4/2007 | Kirsch | |
| 7,249,162 B2 * | 7/2007 | Rounthwaite et al. | 709/206 |
| 7,249,175 B1 * | 7/2007 | Donaldson | 709/225 |
| 7,299,261 B1 | 11/2007 | Oliver et al. | |
| 7,340,438 B2 | 3/2008 | Nordman et al. | |
| 7,395,314 B2 | 7/2008 | Smith et al. | |
| 7,454,195 B2 * | 11/2008 | Lewis et al. | 455/412.1 |
| 7,516,182 B2 | 4/2009 | Goldman | |
| 7,522,908 B2 | 4/2009 | Hrastar | |
| 7,546,348 B2 | 6/2009 | Wilson et al. | |
| 7,571,220 B1 | 8/2009 | Ng | |
| 7,613,776 B1 | 11/2009 | Ben-Yoseph | |
| 7,756,930 B2 | 7/2010 | Brahms et al. | |
| 2001/0032245 A1 | 10/2001 | Fodor | |
| 2002/0023135 A1 | 2/2002 | Shuster | |
| 2002/0048369 A1 | 4/2002 | Ginter et al. | |
| 2002/0087646 A1 * | 7/2002 | Hickey et al. | 709/206 |
| 2002/0120711 A1 | 8/2002 | Bantz et al. | |
| 2003/0009385 A1 | 1/2003 | Tucciarone et al. | |
| 2003/0149888 A1 | 8/2003 | Yadav | |
| 2003/0182379 A1 | 9/2003 | Henry | |
| 2003/0187937 A1 | 10/2003 | Yao et al. | |
| 2003/0196116 A1 | 10/2003 | Troutman | |
| 2003/0212680 A1 | 11/2003 | Bates et al. | |
| 2003/0233418 A1 | 12/2003 | Goldman | |
| 2004/0006747 A1 | 1/2004 | Tyler | |
| 2004/0039786 A1 | 2/2004 | Horvitz et al. | |
| 2004/0083269 A1 | 4/2004 | Cummins | |
| 2004/0148359 A1 | 7/2004 | Ahmed et al. | |
| 2004/0260778 A1 | 12/2004 | Banister et al. | |
| 2005/0015456 A1 | 1/2005 | Martinson, Jr. | |
| 2005/0033810 A1 | 2/2005 | Malcolm | |
| 2005/0055410 A1 * | 3/2005 | Landsman et al. | 709/206 |
| 2005/0080642 A1 | 4/2005 | Daniell | |
| 2005/0080855 A1 | 4/2005 | Murray | |
| 2005/0083915 A1 | 4/2005 | Mathew et al. | |
| 2005/0091320 A1 | 4/2005 | Kirsch et al. | |
| 2005/0091323 A1 | 4/2005 | Smith et al. | |
| 2005/0114453 A1 | 5/2005 | Hardt | |
| 2005/0198159 A1 | 9/2005 | Kirsch | |
| 2005/0198579 A1 | 9/2005 | Perepa et al. | |
| 2005/0251675 A1 | 11/2005 | Marcjan et al. | |
| 2005/0256931 A1 | 11/2005 | Follmeg et al. | |
| 2005/0278620 A1 | 12/2005 | Baldwin et al. | |
| 2006/0036061 A1 | 2/2006 | Bulfer et al. | |
| 2006/0168059 A1 | 7/2006 | Chang et al. | |
| 2006/0253597 A1 | 11/2006 | Mujica | |
| 2007/0067394 A1 * | 3/2007 | Adams et al. | 709/206 |
| 2007/0100701 A1 | 5/2007 | Bocoon-Gibod et al. | |
| 2007/0177731 A1 | 8/2007 | Spies et al. | |
| 2008/0060080 A1 | 3/2008 | Lim | |
| 2008/0126951 A1 | 5/2008 | Sood et al. | |
| 2008/0222127 A1 | 9/2008 | Bergin | |

OTHER PUBLICATIONS

Unknown, "Adaptive Mailing List," 3 pgs., http://www.commtact.com/AML/index.html, Commtact, Apr. 15, 2005.

Unknown, "Email List Manager by Emailsmartz," 3 pgs., http://www.sharewareconnection.com/email-list-manager-by-emailsmartz.htm, Feb. 7, 2003.

Unknown, "eMailMerge 4Outlook," 3 pgs., http://www.sharewareconnection.com/emailmerge-4outlook.htm, Sep. 2004.

Unknown, "InstaGate SoftPak Mail Server," 20 pgs., http://www.esoft.com/service/xSP%20and%20PRO/Email_SoftPak.pdf, eSoft, Inc., 2004.

* cited by examiner

ACCESS LIMITED EMM DISTRIBUTION LISTS

BACKGROUND

A distribution list is a list of members to whom an electronic mail message (EMM) delivered to the distribution list is passed on to. A distribution list allows a user to efficiently send an EMM to a list of addresses. An EMM may include, for example, an email, an instant message (IM), a short message service (SMS) message, multimedia content, hyperlinks to remote content, a meeting request, a task, or an appointment. In operation, the user prepares a single EMM, addresses it to the distribution list, and sends it. When the EMM is delivered to the distribution list, the EMM is forwarded to the addresses in the distribution list. The owners corresponding to the addresses in a distribution list typically share a common trait such as a political interest, a common business purpose, or a common set of friends. In a business setting, distribution lists are typically created for an entire company, each department of the company, each project group, and joint development projects including employees inside of the company and partners outside of the company.

Distribution lists are categorized as external or internal based on whether the addresses in the list are inside or outside of an enterprise associated with the list. An enterprise may be any computer networking structure such as a domain, collection of domains, or other organization. An example of an enterprise is the computer network of a company. Internal addresses are addresses inside of the enterprise associated with the distribution list, and external addresses are addresses outside of the enterprise associated with the distribution list. An internal distribution list has only internal addresses. An external list has at least one external address and may include any number of internal and external addresses. Some embodiments of an enterprise may store an authoritative list of domains in the enterprise and/or a global address list (GAL). To determine whether an address is internal or external to the enterprise, the enterprise may compare the address to the authoritative list of domains and/or the GAL. For example, the domain of an internal address would be found in the authoritative list of domains, and the complete address would be found in the GAL.

Distribution lists are also categorized as open or closed based on the availability of the distribution list to senders outside of an enterprise (i.e., owners of addresses external to the enterprise) associated with the distribution list. An open distribution list is available to senders outside of the enterprise (e.g., addresses outside of the company can send EMM to the distribution list). A closed distribution list is a distribution list that is denied to senders outside of the enterprise (e.g., addresses outside of the company cannot send EMM to the distribution list). In existing EMM systems, internal distribution lists are typically closed, and external distribution lists are typically open.

Open distribution lists can be used to distribute unwanted EMM (i.e., spam) because anyone on the Internet can send EMM to the list. In existing EMM systems, some external distribution lists are closed to reduce spamming, but this means that owners of external addresses on the distribution list cannot send EMM to the distribution list.

Some existing EMM systems use access control lists to limit access to distribution lists. An access control list is a list associated with a file, such as a distribution list, that contains information about which users or groups have permission to access or modify the file. Access control lists are generated and modified by system administrators to control user access to network resources, such as servers, directories, and files. Users other than administrators do not typically have permission to modify access control lists and even if they did have such permission, most users are not able to manipulate an access control list to achieve the desired results (e.g., changing which owners of addresses in a distribution list are allowed to send EMM to the distribution list or modify the access control list).

SUMMARY

Embodiments of the present invention allow users and administrators to limit which external users can send EMM to an otherwise open external distribution list. In particular, embodiments of the invention include systems and methods for processing EMM received at a server of an enterprise from a sending address outside of the enterprise addressed to a distribution list of the enterprise. The enterprise stores a plurality of safe sender lists, each corresponding to an external distribution list of the enterprise, wherein each safe sender list identifies external addresses authorized to send EMM to its corresponding external distribution list. The server receives the EMM, and determines whether the addressed distribution is internal or external. If the distribution list is internal (i.e., has only internal addresses), then the EMM is blocked from being delivered to the distribution list. In some embodiments, if the distribution list is external (i.e., has at least one external address) and the sending address is on a safe sender list corresponding to the addressed distribution list, then the EMM is delivered to the distribution list.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

In one embodiment, the invention includes a system for processing an EMM received at an enterprise. In particular, the invention includes a system for processing an EMM addressed to a particular distribution list of the enterprise from a sending address outside of the enterprise wherein the particular distribution list is one of a plurality of distribution lists of the enterprise including internal distribution lists having only internal addresses and external distribution lists having internal and external addresses. The system blocks the EMM if the particular distribution list does not have external addresses. The system delivers the EMM to the distribution list without filtering the EMM based on content if the sending address is on a safe sender list corresponding to the particular distribution list.

Figure 1:
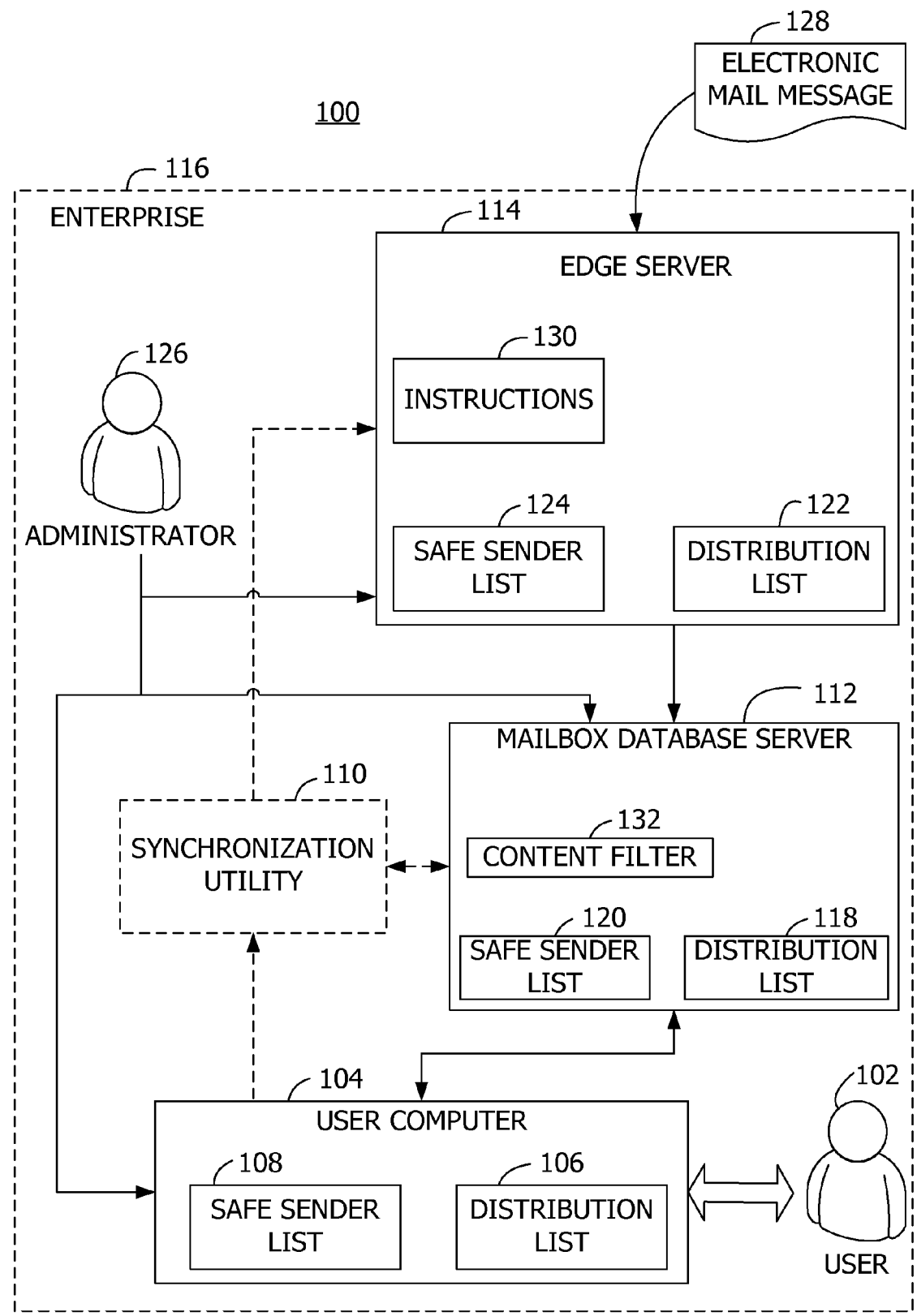
FIG. 1 is an exemplary block diagram illustrating a system for processing EMM received at a server of an enterprise addressed to a distribution list of the enterprise.

Referring to FIG. 1, a system 100 according to one embodiment of the invention is shown wherein a user 102 interacts with a user computer 104 inside of an enterprise 116 to create a distribution list 106 and a corresponding safe sender list 108. As noted below, instructions on the user computer 104 may automatically create or edit the safe sender list 108 and include all of the external addresses of the distribution list 106, or the user 102 may manually create or edit the safe sender list 108. The distribution list 106 and corresponding safe sender list 108 may also be pre-existing and the user 102 may interact with the user computer 104 to modify one or both. Additionally, the distribution list 106 and/or its corresponding safe sender list 108 may be modified based on the contents of an EMM sent to the distribution list 106 by a user such as user 102. For example, if the user 102 sends an email to the distribution list 106 and includes an external address not already in the distribution list 106 in the address line of the email, then the user computer 104 adds the external address to the distribution list 106 and the corresponding safe sender list 108. The system may also allow remove an address from the distribution list 106 in response to an email. For example, the user 102 may send an email or some other EMM to the distribution list 106 wherein the body or some other portion of the EMM such as the subject line of the email includes a minus or other symbol or symbols indicating that the sender wishes to remove the address from the distribution list 106 and an address in the distribution list 106. In response to the email, the user computer 104 would remove the address from the distribution list 106 and the corresponding safe sender list 108 (assuming that the address is in the safe sender list 108). A user corresponding to the removed address is thus no longer subscribed to, or unsubscribed from, the distribution list 106. For example, in another embodiment, the user 102 may unsubscribe from the distribution list 106 by sending an email containing the word "unsubscribe" in the subject line to the distribution list 106. In yet another embodiment, there may be a special unsubscribe address associated with each distribution list 106 such that users having addresses on the distribution list 106 can unsubscribe by sending an EMM to the special unsubscribe address. In another embodiment, a special unsubscribe address could be associated with a plurality of distribution lists, such that a user may unsubscribe from some or all of the distribution lists of an enterprise by sending an EMM to the special unsubscribe address.

A synchronization utility 110 copies the user created (or modified) distribution list 106 and corresponding safe sender list 108 to servers (e.g. mailbox database server 112 and edge server 114) of the enterprise 116. The enterprise 116 may contain any number of edge servers, mailbox database servers, administrators, user computers, and users, as well as other computer network components, and the enterprise 116 may be composed of any number of domains. The synchronization utility 110 may or may not update information on the mailbox database server 112 and edge server 114 in real time as a user 102 or administrator 126 modifies the distribution and safe sender lists. Alternatively, the user 102 or administrator 126 may create the distribution list and its corresponding safe sender list on the edge server 114 directly such that synchronization is not necessary.

If the synchronization utility 110 does not operate in real time, then a corresponding distribution list 118 and safe sender list 120 on the mailbox database server 112, and a corresponding distribution list 122 and safe sender list 124 on the edge server 114 may not be exact copies of the distribution list 106 and safe sender list 108 on the user computer 104 at all times. In one embodiment, the synchronization utility 110 updates the mailbox database server 112 and the edge server 114 on a daily basis. In other embodiments, the synchronization utility 110 updates the servers more frequently including in real time. In still other embodiments, the mailbox database server 112 is updated in real time, but the synchronization utility 110 updates the edge server 114 on a periodic basis. In one embodiment of the invention, one server performs all of the functions of both the edge server 114 and the mailbox database server 112, such that the system 100 consists of only user computers, such as user computer 104, and a server.

In one embodiment of the invention, only the user 102 who created the distribution list 106 and safe sender list 108 is authorized to modify the lists. The system 100 prevents unauthorized individuals from making any changes. In another embodiment of the invention, the user 102 who created the lists and the administrator 126 are authorized to modify the lists. In still another embodiment, the user 102, the administrator 126, and the other owners of addresses in the distribution list 106 are authorized to make changes to the lists.

The system 100 of FIG. 1 illustrates an embodiment of the invention wherein the distribution list 106 and safe sender list 108 are created by the user 102 on the user computer 104, and the lists are copied to the servers of the enterprise 116. Other embodiments of the invention allow the distribution and safe sender lists to be created by an administrator 126 or user 102 directly on a server of the enterprise 116. In one embodiment, the distribution and safe sender lists are maintained on a mail database server, updated by the user on that server via a user computer connected to the server, and copied to the edge server.

In operation of the system 100, a sender outside of the enterprise 116 sends an EMM 128 addressed to the distribution list 106. The edge server 114 receives the EMM 128. The edge server 114 may optionally authenticate the address of the sender (i.e., sending address) via authentication methods known in the art (e.g., senderID and certificates). A set of instructions 130 executed by the edge server 114 determine whether the edge server's local copy of the distribution list 122 includes any external addresses. If the distribution list 122 does not include any external addresses, then the edge server 114 blocks delivery of the EMM 128 to the distribution list 118. The edge server 114 may generate an error message and return it to the sending address, a server associated with the sending address may be instructed by the edge server 114 to generate an error message and provide it to the sending address, or the edge server 114 may take no action such that no status message is providing to the sending address. The administrator 126 of the system 100 may be notified of the blocked EMM 128 so that the administrator 126 can determine whether a denial of service attack or other EMM related malicious behavior is occurring.

If the EMM 128 is not blocked, then the instructions 130 determine whether the sender (i.e., sending address) is authorized to send EMM to the distribution list 106 by searching for the sending address in the copy of the safe sender list 124 on the edge server 114. If the sending address is on the safe sender list 124, then the EMM 128 is delivered to the distribution list 118 without being filtered based on content by a content filter 132 on the mailbox database server 112. If the sending address is not on the safe sender list 124, then the EMM 128 is blocked from being delivered to the distribution list 118. Optionally, instead of immediately blocking the EMM 128 from a sending address not on the safe sender list 124, the EMM 128 may be processed by the content filter 132. The content filter 132 examines the contents of the EMM 128, and the EMM 128 is either blocked from the distribution list 118 or delivered to the distribution list 118 based on the examined contents and the rules of the content filter 132. The rules of the content filter 132 are set by the administrator 126 based on the needs of the organization. The rules may be designed to only reduce spam, or to prevent material inappropriate in the context of the particular enterprise 116 from reaching users in the enterprise 116.

In another embodiment of the invention, the edge server 114 determines whether the distribution list 122 includes external addresses and either blocks the EMM 128 if the distribution list 122 does not have any external addresses, or forwards the EMM to the mailbox database server 112 if the distribution list 122 has an external address. The mailbox database server 112 searches the safe sender list 120 for the sending address and delivers the EMM 128 if the sending address is on the safe sender list 120. If the sending address is not on the safe sender list 120, then the EMM 128 is either blocked by the mailbox database server 112 or filtered based on content by the content filter 132. This configuration frees resources on the edge server 114 such that the system 100 is less susceptible to denial of service attacks.

If the EMM 128 is delivered to the distribution list 118, then it is sent to all of the addresses on the distribution list 118 whether they are internal or external to the enterprise 116.

Figure 2:
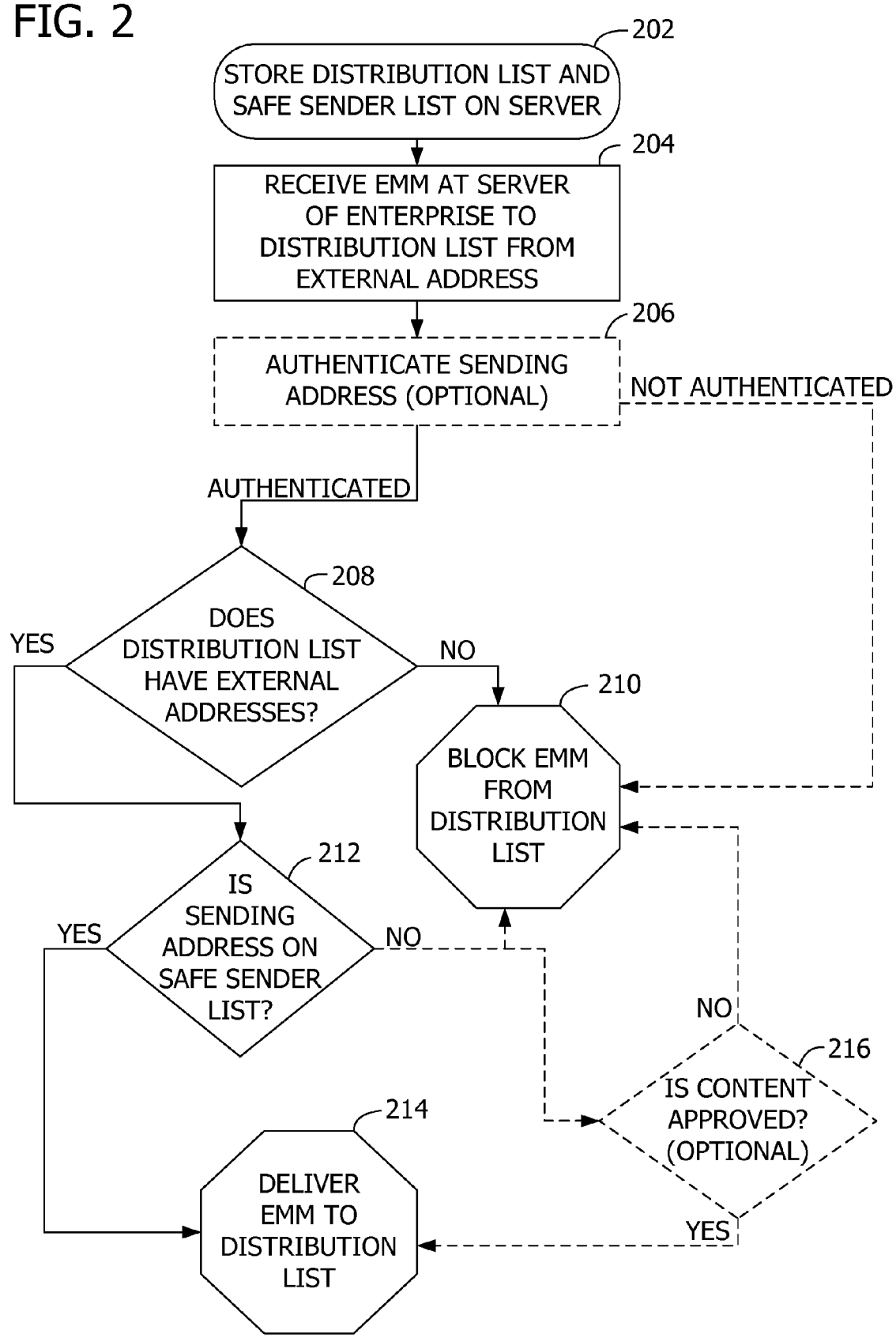
FIG. 2 is an exemplary flow chart illustrating operation of a method of processing an EMM received at a server of an enterprise addressed to a distribution list of the enterprise.

Referring next to FIG. 2, a method of processing an EMM received at a server of an enterprise from a sending address outside of the enterprise addressed to a distribution list of the enterprise according to one embodiment of the invention is illustrated. For example, the method may be exercised by the server 114 executing the instructions 130. At 202, a distribution list and a corresponding safe sender list are stored on a server of the enterprise. At 204, an EMM addressed to the distribution list is received at the server. Optionally, at 206, the sending address may be authenticated. If the sending address cannot be authenticated, then the EMM is blocked at 210, or the EMM may optionally be examined for content at 216. Authenticating the sending address at 206 ensures that the distribution list is closed to outside senders. However, authentication may not be necessary in some embodiments because a user on the internet wanting to send spam (i.e., unwanted EMM's) to the distribution list must first know an external address on the distribution list and corresponding safe sender list. Hiding the members of the distribution list in messages forwarded from the distribution list to the members (i.e., displaying a nickname for the distribution list instead of a list of the members of the distribution list in the "from" field of forwarded messages) makes it difficult for both internal and external users to discover the address of an external user on the distribution list and corresponding safe sender list. Thus, hiding the members of the list may provide sufficient security in some embodiments of the invention such that authenticating the sending address is not preferable.

If the sending address is authenticated at 206 or no authentication is undertaken, then at 208 the server determines whether the distribution list includes any external addresses (i.e., is an external distribution list). In one embodiment, the server may determine whether the distribution list is external by comparing the addresses in the distribution list to an authoritative domain list of the enterprise or a global authoritative list of the enterprise, or by checking a field of the distribution list. If the distribution list does not have any external addresses, then at 210 the EMM is blocked from being delivered to the distribution list. If the distribution list is an external distribution list, then at 212 the server determines whether the sending address is on the safe sender list corresponding to the distribution list. If the sending address is on the safe sender list, then at 214 the EMM is delivered to addresses of the distribution list. If the sending address is not on the safe sender list, then the EMM is either blocked from being delivered to the distribution list at 210 or examined for content at 216. Based on the content of the EMM and predetermined rules applied to the content to determine whether the content is approved to be delivered or not, it may be delivered to the distribution list at 214 or blocked at 210.

When an EMM is blocked at 210, an administrator associated with the enterprise may be notified of the blocked EMM. Additionally, the server of the enterprise may generate and send a status message to the sending address, the server may generate and send a notification to a server associated with the sending address so that the server associated with the sending address generates a status message and provides it to the sending address, or the server of the enterprise may take no action so that no status message is provided to the sending address.

In operation, a computer executes the computer-executable instructions 130 such as those illustrated in the figures to implement aspects of the invention.

As discussed above, embodiments of the invention include methods for creating and maintaining a plurality of safe sender lists, each corresponding to an external distribution list of an enterprise. In one embodiment, a computer receives a distribution list in response to an event such as a user creating the distribution list or a user sending an EMM to the distribution list. The computer compares the addresses in the received distribution list to an address list of the enterprise (e.g. an authoritative domain list or a GAL) to identify any external addresses in the distribution list. The computer copies the identified external addresses to a safe sender list corresponding to the received distribution list. The computer creates a safe sender list corresponding to the distribution list if it does not already exist.

The computer may modify a distribution list or safe sender list in response to input received from a user. The user input may be in the form of an EMM sent to the distribution list by a user or generated by an interface for modifying the lists. Additionally, permission to alter the distribution list and/or corresponding safe sender list may be limited to the user that created the distribution list, or any owner of an address on the lists may have such permission.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having"

are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method of processing electronic mail messages addressed to a particular distribution list of an enterprise from a sending address external to the enterprise wherein the particular distribution list is one of a plurality of distribution lists associated with the enterprise, said particular distribution list comprising a list of electronic mail message addresses, said plurality of distribution lists including internal distribution lists having only internal addresses and external distribution lists having internal and external addresses, said method comprising:

storing a plurality of safe sender lists, each stored safe sender list corresponding to one and only one of the external distribution lists of the enterprise and each external distribution list corresponding to one and only one of the stored plurality of safe sender lists, wherein for each particular external distribution list, its corresponding safe sender list identifies particular external addresses which are authorized to send electronic mail messages to the particular external distribution list;

receiving at a server of the enterprise an electronic mail message addressed to one of the particular distribution lists, said received electronic mail message sent from a specific external sending address;

first determining whether the particular distribution list addressed by the received electronic mail message is an internal distribution list or an external distribution list;

in response to first determining, if the particular distribution list is an external distribution list, then second determining whether the specific external sending address is one of the particular external addresses of the safe sender list corresponding to the particular distribution list; and selectively forwarding the received electronic mail message to the addresses of the one of the particular distribution lists as a function of the first determining whether the particular distribution list is internal or external and as a function of the second determining whether the specific external sending address is on the safe sender list of the particular distribution list, wherein said selectively forwarding further comprises:

blocking the received electronic mail message from being delivered to the addresses of the particular distribution list if the first determining determines that the particular distribution list is an internal distribution list;

delivering the received electronic mail message to the addresses of the particular distribution list if the first determining determines that particular distribution list is an external distribution list and if the second determining determines that the specific external sending address is identified in the safe sender list corresponding to the particular distribution list;

hiding the addresses of members of the particular distribution list and the corresponding safe sender list as a function of the delivering, by preventing disclosure of addresses of the members of the particular distribution list and the corresponding safe sender list, said hiding comprising displaying a nickname for the members of the particular distribution list and the corresponding safe sender list instead of the addresses of the members; and blocking the received electronic mail message to the addresses of the particular distribution list if the first determining determines that particular distribution list is an external distribution list and if the second determining determines that the specific external sending address is not identified in the safe sender list corresponding to the particular distribution list further comprising: adding or removing a particular address from the particular distribution list by and responsive to said adding or removing, and without any further input, adding or removing the particular address from the safe sender list corresponding to the particular distribution list.

2. The method of claim 1 further comprising content filtering the received electronic mail message if the particular distribution list is an external distribution list and the sending address is not identified in the safe sender list corresponding to the particular distribution list.

3. The method of claim 1 wherein said blocking comprises at least one of the following:

providing no status message or notice to an external server associated with the sending address;

generating a status message at the server of the enterprise and providing said status message to said sending address;

generating a notice at the server of the enterprise, providing said notice to a server associated with the sending address, generating a status message at the server associated with the sending address in response to the received notice, and providing said status message to said sending address; and notifying an administrator associated with the enterprise of the blocked electronic mail message.

4. The method of claim 1 further comprising authenticating the sending address and blocking the electronic mail message from being delivered to the particular distribution list if the sending address is not authenticated.

5. The method of claim 1 wherein the particular distribution list is created by a user other than an administrator at a user computer and subsequently copied to the server.

6. A system for processing an electronic mail message received by an enterprise addressed to a particular distribution list of the enterprise from a sending address external to the enterprise wherein the particular distribution list is one of a plurality of distribution lists of the enterprise, said particular distribution list comprising a list of electronic mail message addresses, said plurality of distribution lists including internal distribution lists having only internal addresses and external distribution lists having internal and external addresses, said system comprising:

a server of the enterprise for receiving the electronic mail message addressed to the particular distribution list, said received electronic mail message sent from a specific sending address external to the enterprise;

a plurality of safe sender lists stored on the server, each stored safe sender list corresponding to one and only one of the external distribution lists of the enterprise, wherein each external distribution list corresponding to one and only one of the stored plurality of safe sender lists, wherein for each external distribution list, its corresponding safe sender list identifies external addresses which are authorized to send electronic mail messages to the corresponding external distribution list; and wherein the server executes instructions for:

first determining whether the particular distribution list addressed by the received electronic mail message is an internal distribution list or an external distribution list;

in response to first determining, if the particular distribution list is an external distribution list, then second determining whether the specific external sending address is one of the particular external addresses of the safe sender list corresponding to the particular distribution list; and selectively forwarding the received electronic mail message to the addresses of the particular distribution list as a function of the first determining whether the particular distribution list is internal or external and as a function of the second determining whether the specific external sending address is on the safe sender list corresponding to the particular distribution list, wherein said selectively forwarding further comprises:

blocking the received electronic mail message from being delivered to the addresses of the particular distribution list if the first determining determines that the particular distribution list is an internal distribution list;

delivering the received electronic mail message to the addresses of the particular distribution list if the first determining determines that the particular distribution list is an external distribution list and if the second determining determines that the sending address is identified in the safe sender list corresponding to the particular distribution list;

in response to the delivering, hiding the addresses of members of the particular distribution list and the corresponding safe sender list by preventing disclosure of addresses of the members of the particular distribution list and the corresponding safe sender list, said hiding comprising displaying a nickname for the members of the particular distribution list and the corresponding safe sender list instead of the addresses of the members; and blocking the received electronic mail message from the addresses of the particular distribution list if the first determining determines that the particular distribution list is an external distribution list and the second determining determines that the specific external sending address is not identified in the safe sender list corresponding to the particular distribution list further comprising: adding or removing a particular address from the particular distribution list by and responsive to said adding or removing, and without any further input, adding or removing the particular address from the safe sender list corresponding to the particular distribution list.

7. The system of claim 6 wherein the server further content filters the received electronic mail message if the particular distribution list is an external distribution list and the sending address is not identified in the safe sender list corresponding to the particular distribution list.

8. The system of claim 6 wherein if the server blocks the electronic mail message from the particular distribution list, then at least one of the following:

the server of the enterprise does not return a status message or notice to an external server associated with the sending address;

the server of the enterprise generates a status message and provides said status message to said sending address;

the server of the enterprise generates a notice, provides said notice to a server associated with the sending address, the server associated with the sending address generates a status message in response to the received notice, and the server associated with the sending address provides said status message to said sending address; and the server of the enterprise notifies an administrator associated with the enterprise of the blocked electronic mail message.

9. The system of claim 6 wherein the server authenticates the sending address and blocks the electronic mail message from being delivered to the particular distribution list if the sending address is not authenticated.

10. The system of claim 6 wherein the particular distribution list is created by a user other than an administrator at a user computer and subsequently copied to the server.

11. The system of claim 6 wherein:

addresses are added to or removed from the particular distribution list by a user other than an administrator; and addresses are added to or removed from the safe sender list corresponding to the particular distribution list by a user other than an administrator.

12. A method of creating or maintaining a plurality of safe sender lists, each safe sender list corresponding to one and only one external distribution list of a plurality of external distribution lists of an enterprise and each external distribution list corresponding to one and only one safe sender list, each of said external distribution lists comprising a list of electronic mail message addresses including addresses internal to the enterprise and addresses external to the enterprise, wherein each safe sender list identifies addresses external to the enterprise which are authorized to send electronic mail messages to the external distribution list corresponding to the safe sender list, said method comprising:

receiving an electronic mail message addressed to a particular distribution list of the enterprise, said received electronic mail message sent from a specific sending address external to the enterprise, said electronic mail message including a plurality of addresses in addition the particular external distribution list;

first determining whether the particular distribution list addressed by the received electronic mail message is an internal distribution list or an external distribution list;

in response to first determining, if the particular distribution list is an external distribution list, then second determining whether the specific external sending address is one of the particular external addresses of the safe sender list corresponding to the particular distribution list;

blocking the received electronic mail message from being delivered to the addresses of the particular distribution list if the first determining determines that the particular distribution list is an internal distribution list;

delivering the received electronic mail message to the particular distribution list if the first determining determines that the particular distribution list is an external distribution list and if the second determining determines that the sending address is identified in the safe sender list corresponding to the particular distribution list, wherein said delivering comprises at least one of the following: comparing the plurality of addresses of the received electronic mail message to at least one of a global authoritative address list of the enterprise and a domain list of the enterprise to identify addresses of the received plurality of addresses which are external to the enterprise, and hiding only the addresses of members of the particular distribution list and the corresponding safe sender list to prevent disclosing addresses of the members, said hiding comprising displaying a nickname for the distribution list instead of the addresses of the members; and copying the identified external addresses to the safe sender list corresponding to the particular distribution list; and blocking the received electronic mail message from the particular distribution list if the first determining determines that the particular distribution list is an external distribution list and the second determining determines that the specific external sending address is not identified in the safe sender list corresponding to the particular distribution list.

13. The method of claim 12 further comprising adding or removing an address from the safe sender list in response to the received electronic mail message.

14. The method of claim 13 further comprising further comprising determining whether the received electronic mail message is from a user who created the received distribution list and adding or removing an address from the safe sender list only if the sender of the received electronic mail message is determined to be the user who created the received distribution list.

* * * * *